United States Patent [19]

Chen et al.

[11] Patent Number: 4,950,430
[45] Date of Patent: Aug. 21, 1990

[54] STRUCTURED TOWER PACKING

[75] Inventors: Gilbert K. Chen, Farmers Branch, Tex.; Michele Acerra, Califon, N.J.

[73] Assignee: Glitsch, Inc., Dallas, Tex.

[21] Appl. No.: 261,503

[22] Filed: Oct. 24, 1988

Related U.S. Application Data

[63] Continuation of Ser. No. 936,288, Dec. 1, 1986, abandoned.

[51] Int. Cl.⁵ ............................................. B01F 3/04
[52] U.S. Cl. .................................................. 261/112.2
[58] Field of Search ..................... 261/112.2; 428/182, 428/183, 184

[56] References Cited

U.S. PATENT DOCUMENTS

| | | | |
|---|---|---|---|
| 899,899 | 9/1908 | Peterson | 261/94 |
| 1,549,068 | 8/1925 | Dickey | 261/112 |
| 2,003,271 | 5/1935 | Beimann et al. | 261/111 |
| 2,047,444 | 7/1936 | Stedman | 261/94 |
| 2,206,440 | 7/1940 | Walker | 261/112 |
| 2,356,653 | 8/1944 | Cox | 261/112 |
| 2,470,652 | 5/1949 | Scofield | 261/95 |
| 2,602,651 | 7/1952 | Cannon | 261/DIG. 72 |
| 2,630,305 | 3/1953 | Scofield et al. | 261/94 |
| 2,767,967 | 10/1956 | Hutchison | 261/113 |
| 2,782,009 | 2/1957 | Rippingille | 257/245 |
| 2,783,982 | 3/1957 | Kahl | 261/94 |
| 2,793,017 | 5/1957 | Lake | 261/112 |
| 2,911,056 | 11/1959 | Edel | 261/112 |
| 2,940,168 | 6/1960 | Monroe | 261/112 |
| 2,955,064 | 10/1960 | Frohmader | 261/104 |
| 3,010,706 | 11/1961 | McWilliams | 261/112 |
| 3,013,781 | 12/1961 | Hasselden | 261/112 |
| 3,013,782 | 12/1961 | Glitsch | 261/114 |
| 3,084,918 | 4/1963 | Kohl et al. | 261/112 |
| 3,155,153 | 11/1964 | Axelsson | 165/8 |
| 3,183,963 | 5/1965 | Mondt | 165/166 |
| 3,206,536 | 9/1965 | Goodloe | 174/35 |
| 3,285,587 | 11/1966 | Huber | 261/112 |
| 3,346,246 | 10/1967 | Loetel et al. | 261/112.2 |
| 3,359,616 | 12/1967 | Butt | 29/157.3 |
| 3,389,895 | 6/1968 | DeFlon | 261/111 |
| 3,415,502 | 12/1968 | Munters | 261/112 |
| 3,417,975 | 12/1968 | Williams et al. | 261/114 |
| 3,430,934 | 3/1969 | Weishrupt | 261/94 |

(List continued on next page.)

FOREIGN PATENT DOCUMENTS

| | | |
|---|---|---|
| 1095827 | 2/1981 | Canada . |
| 0335817 | 4/1939 | Fed. Rep. of Germany . |
| 0846092 | 8/1952 | Fed. Rep. of Germany . |
| 1283250 | 1/1968 | Fed. Rep. of Germany . |
| 1261484 | 2/1968 | Fed. Rep. of Germany . |
| 1281398 | 10/1968 | Fed. Rep. of Germany . |
| 1667182 | 9/1970 | Fed. Rep. of Germany . |
| 2032292 | 4/1971 | Fed. Rep. of Germany . |
| 2060178 | 11/1971 | Fed. Rep. of Germany . |
| 2205371 | 11/1972 | Fed. Rep. of Germany . |
| 2601890 | 1/1976 | Fed. Rep. of Germany . |
| 3414267 | 7/1985 | Fed. Rep. of Germany . |
| 1362271 | 4/1964 | France . |
| 2029586 | 10/1970 | France . |

(List continued on next page.)

*Primary Examiner*—Tim Miles
*Attorney, Agent, or Firm*—Johnson & Gibbs

[57] ABSTRACT

Disclosed is a tower packing for vapor-liquid contact which includes a plurality of sheets of corrugated material, the sheets being arranged generally vertically and parallel to one another with the corrugations of adjacent sheets criss-crossing one another. The sheets are provided with a plurality of holes for effecting both liquid and vapor distribution in said packing, and the holes are arranged on the sheets with the horizontal spacing between adjacent holes being no greater than about five times the horizontal extent of a hole, and in no event greater than about 5 millimeters. The horizontal extent of the holes is no greater than about 2 millimeters.

In one form the packing is constructed so that the angle said corrugations strike to the vertical axis of the packing and the fold-to-fold dimension of the corrugations are so selected with respect to the horizontal and vertical extent of a hole and the horizontal and vertical spacing between adjacent holes that a plurality of said holes fall on a given corrugation fold of a sheet.

27 Claims, 4 Drawing Sheets

U.S. PATENT DOCUMENTS

| | | | |
|---|---|---|---|
| 3,450,393 | 6/1969 | Munters | 261/112 |
| 3,466,151 | 9/1969 | Sicard et al. | 261/112 |
| 3,495,656 | 2/1970 | Dickson | 165/166 |
| 3,540,702 | 11/1970 | Uyama | 261/112 |
| 3,574,103 | 4/1971 | Latkin | 428/183 |
| 3,599,943 | 8/1971 | Munters | 261/112 |
| 3,603,129 | 9/1971 | Williams et al. | 261/114 |
| 3,645,830 | 2/1972 | Warp | 156/510 |
| 3,733,063 | 5/1973 | Loetel et al. | |
| 3,785,620 | 1/1974 | Huber | 261/112 |
| 3,799,512 | 3/1974 | Raybon | 261/29 |
| 3,830,684 | 8/1974 | Hamon | 261/112 |
| 3,918,688 | 11/1975 | Huber et al. | 261/112 |
| 3,997,632 | 12/1976 | Kloss | 261/112 |
| 4,028,442 | 6/1977 | Eckert | 261/94 |
| 4,036,917 | 7/1977 | Slobodyanik | 261/114 |
| 4,052,491 | 10/1977 | Lefevre | 261/112 |
| 4,107,241 | 8/1978 | Braun | 261/79 A |
| 4,128,684 | 12/1978 | Bornio et al. | 261/112 |
| 4,157,929 | 6/1979 | Kubicek | 165/166 |
| 4,186,159 | 1/1980 | Huber | 261/112 |
| 4,238,426 | 12/1980 | Slobodyanik | 261/114 |
| 4,296,050 | 10/1981 | Meier | 261/112 |
| 4,339,399 | 7/1982 | Nutter | 261/112 |
| 4,344,899 | 8/1982 | Monjoie | 261/112 |
| 4,356,611 | 11/1982 | Chen et al. | 29/157 R |
| 4,366,608 | 1/1983 | Nagoka | 261/DIG. 72 |
| 4,562,015 | 12/1985 | Lefevre | 261/112 |
| 4,597,916 | 7/1986 | Chen | 261/94 |
| 4,604,247 | 8/1986 | Chen et al. | 261/112 |
| 4,623,454 | 11/1986 | Tauscher et al. | 261/112 |
| 4,643,853 | 2/1987 | Braun | 261/112 |

FOREIGN PATENT DOCUMENTS

| | | |
|---|---|---|
| 2338065 | 1/1976 | France . |
| 2313111 | 12/1976 | France . |
| 0444761 | 2/1964 | Japan . |
| 444761 | 2/1969 | Japan . |
| 57-36009 | 2/1982 | Japan . |
| 0376943 | 6/1964 | Switzerland . |
| 0398503 | 3/1966 | Switzerland . |
| 1253673 | 9/1974 | Switzerland . |
| 0608380 | 1/1979 | Switzerland . |
| 0574949 | 1/1946 | United Kingdom . |
| 0734874 | 8/1955 | United Kingdom . |
| 0843119 | 8/1960 | United Kingdom . |
| 0973746 | 11/1964 | United Kingdom . |
| 0980825 | 1/1965 | United Kingdom . |
| 0995107 | 6/1965 | United Kingdom . |
| 1004046 | 9/1965 | United Kingdom . |
| 1055796 | 1/1967 | United Kingdom . |
| 1055797 | 1/1967 | United Kingdom . |
| 1055798 | 1/1967 | United Kingdom . |
| 1055822 | 1/1967 | United Kingdom . |
| 1073315 | 6/1967 | United Kingdom . |
| 1084794 | 9/1967 | United Kingdom . |
| 1106566 | 3/1968 | United Kingdom . |
| 1118452 | 3/1968 | United Kingdom . |
| 1127752 | 9/1968 | United Kingdom . |
| 1221073 | 2/1971 | United Kingdom . |
| 1245938 | 9/1971 | United Kingdom . |
| 1253878 | 11/1971 | United Kingdom . |
| 1447487 | 8/1976 | United Kingdom . |

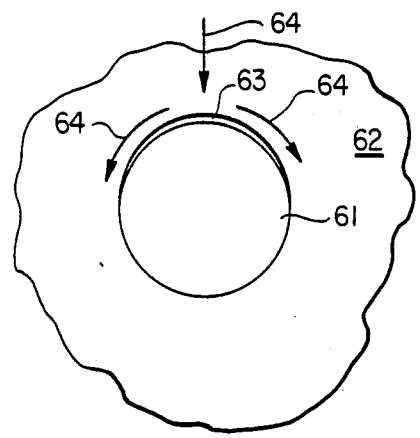
FIG. 7
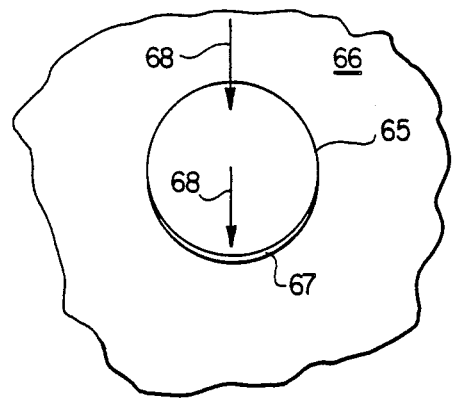
FIG. 8
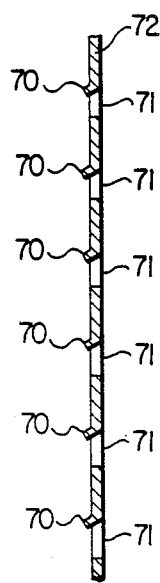 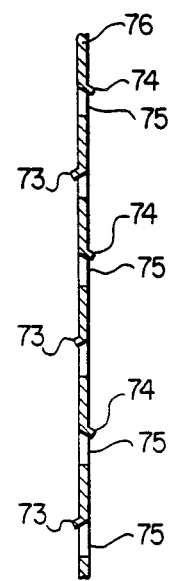 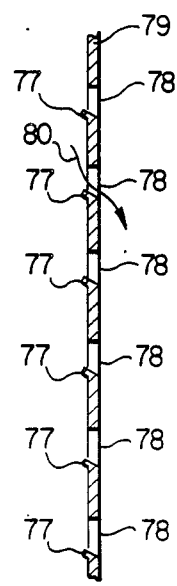
FIG. 9      FIG. 10      FIG. 11

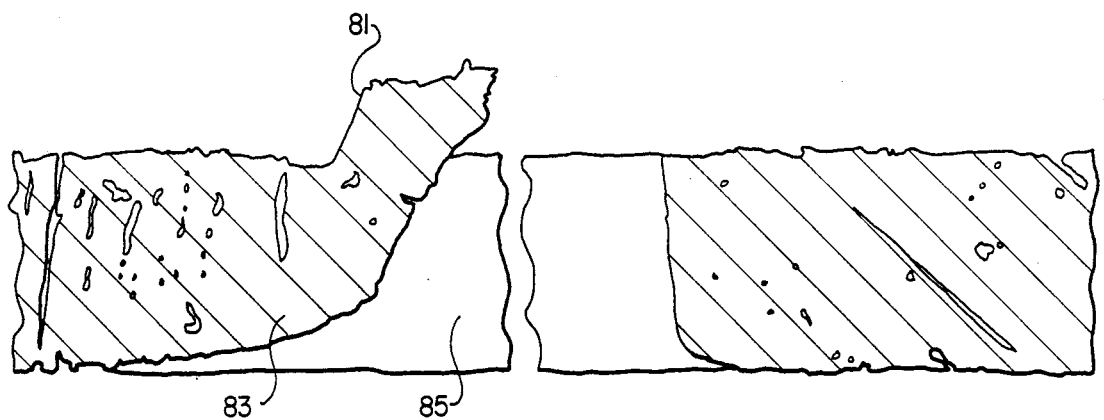
FIG. 12
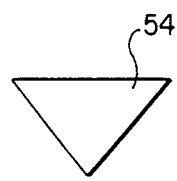 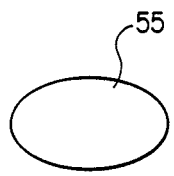 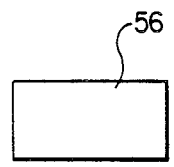 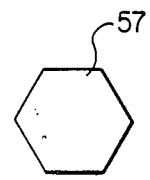
FIG. 13A    FIG. 13B    FIG. 13C    FIG. 13D
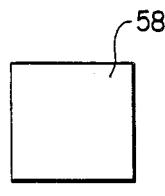 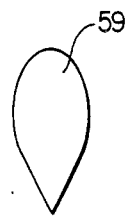 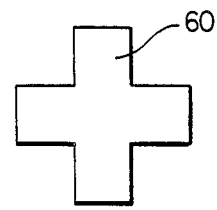
FIG. 13E    FIG. 13F    FIG. 13G

STRUCTURED TOWER PACKING

This is a continuation of Ser. No. 936,288, filed 12/11/86, now abandoned.

FIELD OF THE INVENTION

The present invention relates to tower packing, and, more particularly, to structured tower packing for columns incorporating counter-current vapor-liquid flow therethrough.

BACKGROUND OF THE INVENTION

In the chemical engineering arts, structured tower packings are a known class of devices used to effect heat and mass transfer between vapor and liquid streams in a tower for the purposes of distillation, rectification, fractionation, stripping, splitting, absorption, desorption, cooling, heating, and similar unit operations. Towers containing structured tower packing are a form of packed towers, and are most often operated with the vapor and liquid streams in counter-current flow.

The primary design object in a structured tower packing is to provide ample opportunity for the liquid and vapor which are typically flowing in counter-current relation through the tower to come into intimate and extended reactions with one another so that the mass and energy exchange reactions between the vapor and liquid may proceed. These reactions are in most instances gas film coefficient controlled, ultimately, and in this circumstance means that care must be taken to obtain good gas distribution, and such turbulence and mixing in the gas as can be readily had, so that the vapor or gas film at the interface is as thin as possible.

These reactions are also strongly dependent on the area of contact between the vapor and the liquid, and this circumstance means that care should be taken to obtain very good liquid distribution over the surface of the packing so that the area of contact is as large as can be obtained.

Structured tower packings are passive devices in the sense that they have no moving parts, and no external power is input directly to them. As a consequence, the objects of obtaining good vapor and liquid distribution and good intimate contact between the vapor and the liquid must be obtained, if at all, by configuring the structure of the packing and its surface and through-the-surface features to maximize the liquid and vapor distribution in a passive manner.

Within the field of structured tower packing, one type which has been of technical and commercial importance in recent times is that which is formed of a plurality of sheets or lamellae of one or another kinds of material, with the sheets being corrugated and arranged generally parallel to the axis of the tower in which they are installed. The sheets are corrugated and provided with holes or apertures. The holes or apertures are known to facilitate gas or vapor distribution within the packing, particularly laterally of the packing, and also to act as liquid distributing devices affecting the flow pattern of liquid moving across the sheets. The sheets are preferably corrugated, with the corrugations arranged at angles to the tower axis so that the corrugations of adjacent strips criss-cross. This latter construction makes it unnecessary to use various spacers or other supplementary devices to position the sheets with respect to one another, unless that is especially desired, since the criss-crossing ridges of the plates provide sufficient mechanical strength to maintain the plates in the desired position, especially if they are wrapped with binding material, or are spot welded or otherwise connected at their points of contact.

Early examples of this class of structured tower packing are taught in Stedman U.S. Pat. No. 2,047,444 and Huber British Patent No. 1,004,046. More recently, efforts have been made to improve the performance of this kind of packing by various sorts of surface or through-the-surface treatments. Examples of tower packing within this class having such treatments include: U.S. Pat. No. 4,296,050 to Meier; U.S. Pat. No. 4,604,247 to Chen et al., West German application No. 3,414,267.3 to Raschig.

The performance of tower packings and other vapor liquid separation devices such as trays is commonly evaluated by a parameter defined as Height Equivalent to a Theoretical Plate (H.E.T.P.), as first proposed in an article by W. A. Peters appearing in the June 1922 issue of Journal of Industrial and Engineering Chemistry. The H.E.T.P. is expressed in linear dimensions, such as, feet, inches, meters or centimeters, and the lower or smaller the H.E.T.P., the better the efficiency of the vapor-liquid contact device under consideration. H.E.T.P. is often plotted against parameters which are indicative of vapor and liquid flow rates such as F-factor (defined as $V_s[D_v]^{0.5}$, (lbs/ft$^3$)$^{0.5}$ ft/sec.) and C-Factor (defined as $V_s[D_v/(D_1-D_v)]^{0.5}$, ft/sec.). Where $V_s$=Superficial velocity, ft./sec.; $D_v$=Vapor density lbs./ft$^3$; and $D_1$=Liquid Density, lbs/ft$^3$. It is generally preferred that plots of H.E.T.P. against such parameters produce curves which are as flat as can be had, over as broad a range of the flow rate parameter as possible. Such flat curves are indicative of good performance over a wide range of operating conditions, including the region near flooding at high flow rates and at very low liquid rates, where the volumetric flow rate of liquid may be so low that not enough liquid is available to wet out the entire plate surface of the packing.

SUMMARY OF THE INVENTION

The present invention relates to an improved structured tower packing of the corrugated plate-type in which the corrugation angles are such that the corrugations of adjacent plates criss-cross and wherein the plates are apertured or provided with holes which are specially sized and positioned upon the plates.

More particulary, one aspect of the present invention includes a tower packing for vapor-liquid contact made up of a plurality of sheets of corrugated material. The sheets are arranged generally vertically and parallel to one another with the corrugations of adjacent sheets criss-crossing one another. The sheets are provided with a plurality of holes for affecting both liquid and vapor distribution in the packing. The holes are arranged on the sheets with the horizontal spacing between adjacent holes being no greater than about five times the horizontal extent of a given hole and in any event no greater than about 5 millimeters. As used herein, "horizontal extent of a given hole" means the largest dimension of the hole measured in a horizontal direction (in the case of a round hole, its diameter) and "horizontal spacing between adjacent holes" means the closest horizontal edge-to-edge distance between adjacent holes. The horizontal extent of the holes is no greater than about 2 millimeters. A practical lower limit on hole size is about 1 millimeter in horiztonal extent, since tooling for smaller holes tends to be fragile and troublesome.

It is also preferred that the holes be arranged generally orthogonally on said sheets. The term orthogonal is used herein to denote that vertical rows of holes are generally parallel to the axis of a vertically arranged tower, and horizontal rows of holes extend generally at right angles to the tower axis and thus orthogonal to the vertical rows. The term is also used to denote an arrangement of holes which is generally rectangular in appearance, as distinguished from a triangular pattern of holes. It is also preferred that a vertical spacing between adjacent holes is no greater than about 5 millimeters.

In accordance with another aspect of the invention, there are also certain relationships established between hole size, hole spacing, preferably hole pattern, corrugation angle, and the fold-to-fold dimension of the corrugations in order to maximize the gas and liquid distribution, while minimizing pressure drop in the gas phase, and enhancing the overall performance of the packing.

Holes perform several functions in packings of this kind. They act as liquid dividers, which divert the flow of liquid on a packing sheet around them, thus aiding in the horizontal or lateral spread of the liquid. They also act as gas distributors, enabling gas to flow laterally through the packing from one corrugation channel to another. Holes also enable liquid to flow from one side of a packing sheet to the other side of the same sheet, thus exposing a fresh surface of a liquid film to gas contact, a particularly efficient step, and otherwise stirring and mixing the liquid film. Finally, some holes sheet over with liquid and thus provide gas access to both sides of a thin liquid film, again enhancing mass and energy transfer. A given hole may perform any or all of these functions sequentially and repeatedly during the operation of a vapor liquid contact tower.

With respect to the corrugations, the fold-to-fold dimension of such corrugations has a large influence on the vapor phase pressure drop through the packing, since it is the fold-to-fold dimension which defines the size of the generally triangularly-shaped angles gas flow passages through the packing. This dimension also determines the amount of sheet area in a sheet of nominal rectangular dimensions; the smaller the fold-to-fold corrugation dimension, the larger the surface area of the plate is. It is also known that in a corrugated tower packing of the criss-crossed type, the downwardly flowing liquid tends to concentrate in the troughs and/or valleys of the corrugations.

The foregoing considerations make it desirable to size the holes so that all of the above listed effects on liquid flow are obtained or are obtainable in view of the surface tension properties of the liquid being treated. It is also desirable to position many of the holes in a sheet in the folds occurring at the valleys of the corrugations. It should, of course, be noted that a valley on one side of a sheet is a peak or ridge on the other side of the sheet. In this manner, the holes have the maximum opportunity to advantageously effect the flow and distribution of the liquid on the sheet.

To this end, it is desirable in accordance with the present invention to have the tower packing arranged so that the angle which the corrugations strike to the vertical axis of the packing and the fold-to-fold dimension of the corrugations are so selected with respect to the horizontal and vertical extent of a hole and the horizontal and vertical spacing between adjacent holes that a plurality of the holes and preferably many of them fall on corrugation folds of the sheet.

In a preferred form the foregoing considerations produce a tower packing in which the spacing of the holes is substantially equal in the horizontal and vertical directions and further in which the corrugations strike an angle of about 45° to the vertical axis of the packing. These considerations also lead to a preference for a tower packing in which the horizontal projection of the fold-to-fold dimension of the corrugations is substantially a multiple of the horizontal spacing between holes of the packing. More preferably, that multiple is two or more and in any event should fall between 2 and 20.

It its preferred form, the tower packing of the invention is one in which the holes are round, inasmuch as this is an easy hole shape to tool for and produce. Nonetheless, the invention contemplates inclusion of holes that are other than round in which event it is preferred that their hydraulic radius be no greater than about 1 millimeter. Examples on non-round holes include ovals, oblongs, elliptical holes, triangular holes, rectangular holes, narrow slit-type holes, and the like.

It has been found that the liquid dividing function of the holes mentioned above is enhanced if the holes are provided with small ridges or burrs at least around their upper rims, and it is accordingly preferred that this construction be used in accordance with the invention. The burrs project outwardly and provide small dams which divert the liquid laterally at the edge of a hole. It is further preferred that burrs project from opposite sides of a tower packing sheet so that their liquid division enhancing function is obtained on both sides of the sheet.

If the burr occurs at the bottom of a hole, instead of at the top, its predominant function is to divert liquid through the hole to the other side of the sheet instead of dividing it. This, too, is a desirable function and promotes mass and heat transfer.

It has been found that in the operation of perforating sheet materials, particularly metal sheets, there is an important and strong relationship between hole size and both the relative and absolute sizes of the burr accompanying a given hole in terms of burr length and height and the amount of "puckering" or distortion along the hole edge resulting from the frictional forces involved in the hole punching operation. It has further been found in accordance with the invention that when holes of a diameter no greater than about 2 millimeters are compared with holes only moderately larger, such as the 4 millimeter diameter holes common in tower packings of the prior art, the burrs associated with the smaller holes show not only greater size variances, but also averaged values for burr length and height which are an order of magnitude greater than those for the larger holes. As is pointed out above, these prominent burrs aid in the liquid division and diversion functions of the holes.

In the discussion above, several different effects of the holes were listed and discussed, several of them acting primarily on the liquid flowing down the sheet. It has been found that in order to maximize the obtaining of such effects, the size of the holes in the sheet should not be too large, and hence the maximum holes size of about 2 millimeters horizontal extent is specified in accordance with the invention. At the same time, the total open area on a sheet established by the holes should be no greater than by about 20 percent of the area of the sheet. If it is greater, efficiency falls off to the point where greater tower height is needed to provide adequate surface area for the liquid and gas to interact.

Various materials of construction may be employed in accordance with the invention. The preferred material is sheet metal of a type having adequate corrosion resistance and inertness to the liquids and vapors being treated in the particular tower under consideration. Alternate materials include plastic, paper, particularly resin-impregnated paper, or ceramics. The material may be of the expanded type, such as expanded metal or plastic, or it may be a woven or knitted material, such as woven wire cloth or knitted wire mesh, or corresponding materials formed of plastic resins or textiles. Various through-the-surface features such as slits may be employed in addition to the holes, and various kinds of surface features such as grooves and fluting or embossing may be utilized. All these special structures or surface treatments are for the purpose of enhancing the spread of liquid on the sheet to enlarge and maintain its area of contact with the vapor.

From the foregoing it can be seen that the principal object of this invention is the provision of an improved tower packing of the corrugated criss-crossed apertured sheet type which has improved efficiency and performance as compared with prior packings.

The manner in which this object, together with other objects and purposes is obtained in accordance with the invention may best be understood by a consideration of the detailed description which follows, together with the accompanying drawings.

BRIEF DESCRIPTION OF THE DRAWINGS

FIG. 7 is an enlarged fragmentary plan view of a single hole through a sheet, with the burr associated with the hole being located across the top of the hole FIG. 8 is an enlarged fragmentary plan view of a single hole through a sheet, with the burr associated with the hole being located across the bottom of the hole;

FIG. 9 is a diagrammatic cross-sectional elevational view of a portion of a sheet of packing with the burrs thereon being positioned at the tops of the holes and all projecting to one side of the sheet;

FIG. 10 is a diagrammatic cross-sectional elevational view of a portion of a sheet of packing with the burrs thereon being positioned at the tops of the holes and projecting to both sides of the sheet;

FIG. 11 is a diagrammatic cross-sectional elevational view of a portion of a sheet of packing with the burrs thereon being positioned at the bottoms of the holes and projecting to one side of a sheet;

FIG. 12 is an enlarged cross-sectional view copied from a micro-photograph of a sheet having a hole with a burr associated therewith;

FIGS. 13A-13G are plan views of holes of a variety of shapes for use in a tower packing sheet.

DETAILED DESCRIPTION PREFERRED EMBODIMENTS

Figure 1:
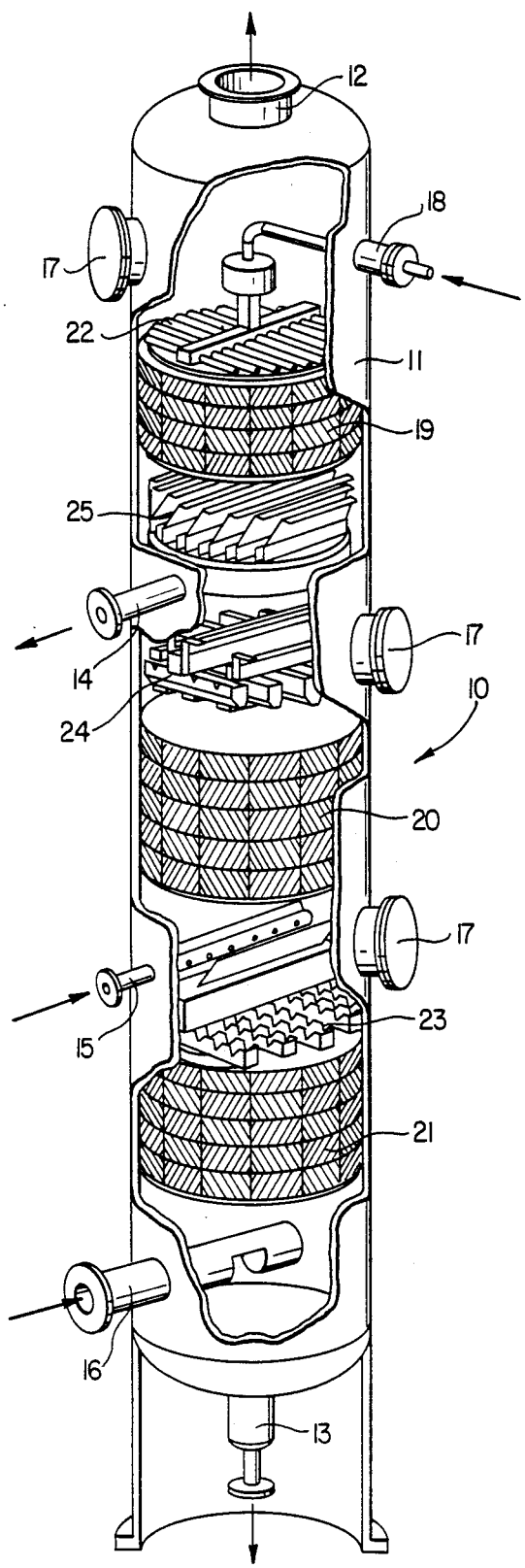
FIG. 1 is a somewhat simplified diagrammatic isometric view of a packed tower utilizing a tower packing constructed in accordance with the principles of the present invention.

Referring first to FIG. 1, there is illustrated a process tower designated generally as 10. The tower has a metal shell 11 and has piping for various streams provided thereon. Thus there is an overhead line 12, and a bottom stream take-off 13. There is also a side stream draw-off line 14, a side feed line for liquid 15, and a side stream vapor feed line or reboiler return line 16 for vapor. Also provided is a reflux return input line 18. Manways 17 are provided at various points in the tower for access during shut down or turn around for maintenance and construction purposes.

The tower 10 illustrated in FIG. 1 has three packing beds in it designated from top to bottom 19, 20 and 21. Vapor enters the tower through reboiler return line 16 and courses upwardly through the tower and packing beds 19, 20, 21 to leave through overhead line 12. In doing so, the vapor stream is enriched by material evaporated into it as it passes through the packing beds, and is depleted by material condensed from it as it passes through said beds.

In operation, liquid is also fed into the tower through reflux return line 18 and side stream feed input line 15. The liquid flows downwardly through the tower and ultimately leaves the tower either as side stream draw off through line 14, or at bottom stream draw off through line 13. In its downward flow, the liquid is depleted of some material which evaporates from it as it passes through the packing beds 19, 20 and 21, and is enriched or added to by material which condenses into it out of the vapor stream.

Associated with the reflux input line 18 is a distributor 22 for distributing the liquid across the top of packing bed 19. Associated with side stream input line 15 is another distributor 23 which serves the same function with respect to liquid entering the bottom packing bed 21. A liquid distributor 24 is also provided above packing bed 20 for redistributing liquid flowing downwardly out of collector tray 25. Collector tray 25 is positioned below the top packing bed 19 and a fraction of the liquid so collected is drawn off through side stream draw off line 14.

Although many variations in tower arrangement are possible, that shown in FIG. 1 for illustrative purposes may be taken as typical. The special structured tower packing material of the present invention is utilized in packing beds 19, 20, 21 is described in more detail below.

Figure 2:
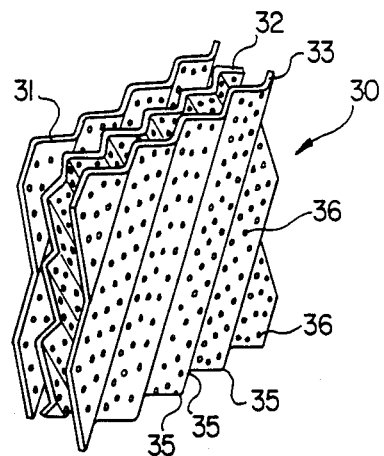
FIG. 2 is a fragmentary, isometric view on an enlarged scale of a portion of a tower packing constructed in accordance with the principles of the present invention.
Figure 3:
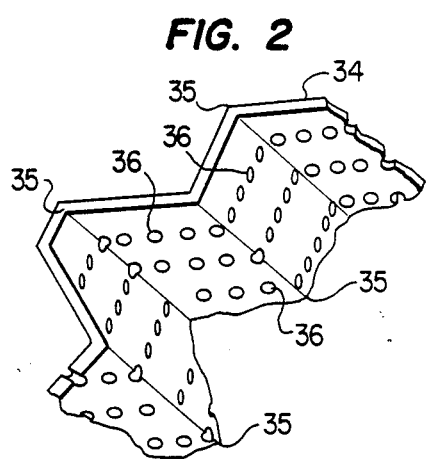
FIG. 3 is an enlarged, fragmentary isometric view of a portion of a single sheet of the tower packing material of FIG. 2.

Referring now to FIGS. 2 and 3 in combination it can be seen that the tower packing of the present invention designated generally as 30, includes a plurality of sheets 31, 32, 33 and 34 which are corrugated along fold lines indicated at 35 and provided with holes or perforations or apertures 36. The corrugation fold lines are arranged at angles so that they criss-cross when adjacent plates are considered. In this way there are formed a number of troughs or generally triangularly cross-sectioned passages which are angled upwardly so far as gas flow is concerned and which are angled downwardly so far as liquid flow is concerned, the passages being open topped and intersecting repeatedly other passages of opposite angulation.

Figure 14:
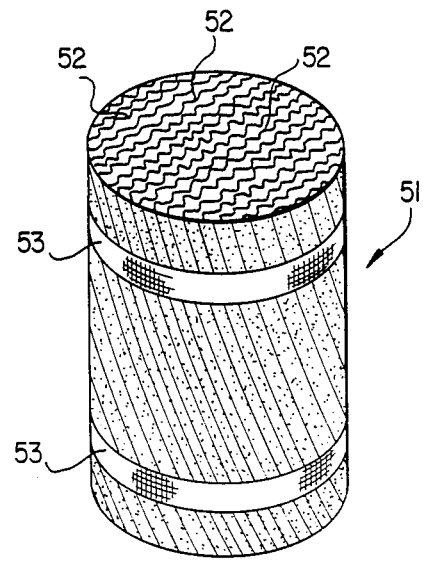
FIG. 14 is a diagrammatic isometric view on a reduced scale of a tower packing cartridge constructed in accordance with the invention.

In FIG. 14 a single tower packing element or cartridge 51 is shown in isolation. It is generally cylindrical in shape to fit in a round column, and is made up of a plurality of corrugated and perforated sheets 52 arranged in parallel relation with the corrugations of adjacent sheets criss-crossing. The sheets are preferably held in position by bands 53 which also help to seal against the inner wall of the column. The packing beds 19, 20 and 21 of FIG. 1 are each formed of a plurality of cartridges or elements 51 stacked in the column with adjacent elements rotated so that sheets thereof cross.

Figure 4:
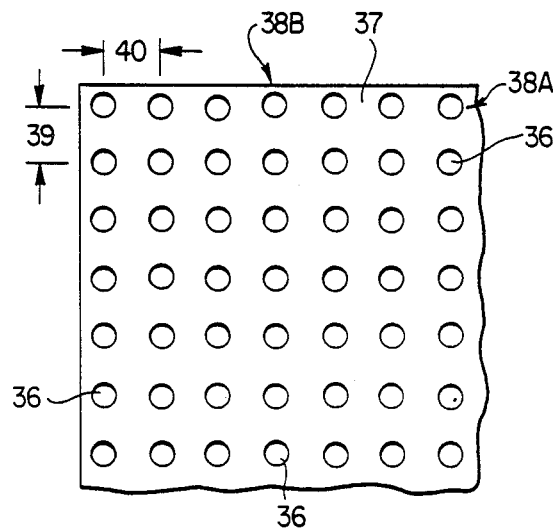
FIG. 4 is a fragmentary plan view of a portion of a sheet of tower packing material constructed in accordance with the invention.
Figure 6:
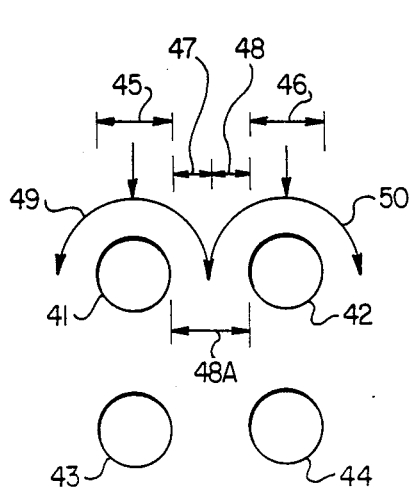
FIG. 6 is a diagram of a hole pattern utilized in accordance with the invention for the purpose of showing certain geometric relations having a bearing on liquid distribution considerations.

Referring to FIG. 4, there is shown a sheet 37 before corrugating, the holes 36 are preferably arranged in an orthogonal pattern. In the case of the orthogonal pattern shown in FIG. 4 there are horizontal rows 38A and vertical rows 38B and all of the holes 36 fall both in a horizontal row and a vertical row. In addition, in the particular orthogonal pattern shown in FIG. 4, the vertical spacing on a hole-center-to-hole-center distance 39 is preferably the same as the horizontal hole-center-to-hole-center distance 40. As has been mentioned above, it is preferred that the hole diameter of round holes 36 be no greater than about 2 millimeters. If holes which are other than round employed it is preferred that they be dimensioned first, so that their horizontal extent is no greater than about 2 millimeters, and secondly that their hydraulic radius be no greater than about 1 millimeter. Some of the reasons for these preferences can be seen from a consideration of FIG. 6 to which attention is now directed. In FIG. 6 a group of holes 41, 42, 43, 44 are shown arranged in an orthogonal and basically square pattern in dashed lines. If a liquid stream is visualized as flowing in two strands down the plate on which holes 41–44 are located in two streams each basically of the same width as said holes, it can then be seen that the stream widths are indicated by the arrows 45 and 46. When such hypothetical streams encounter holes 41 and 42, it is known from observation that the streams split and tend to flow around the holes. If holes 41 and 42 are located a distance apart such that their horizontal spacing is no greater than about the horizontal extent of holes 41 and 42, in the case of round holes, their diameter, then the split streams will occupy basically all of the spacing between holes 41 and 42. The size of the split streams is indicated by arrows 47 and 48, and the stream dividing effect is indicated diagrammatically by the arcuate arrows 49 and 50. Arrow 48A thus illustrates the total stream area between holes 41 and 42 which is filled by stream 47 and 48 as shown.

If, instead of flowing around holes 41 and/or 42 the holes are sized so that the liquid may flow across the holes, then the stream proceeds across the holes 41 and/or 42 and eventually these streams encounter holes 43 and 44 where they may be split as just described or again flow across the holes. In addition to flow across the holes, there will be, in some instances, flow through the holes so that the liquid is transferred to the backside of the sheet down which it is flowing.

FIGS. 13A–13G illustrates some possible variations of hole shape, 54 being triangular with the top side horizontal, although other orientations can be used; 55 is an oblong or oval hole; 56 is a horizontally oriented rectangular hole; 57 is an octangonal hole; 58 is a square hole; 59 is a tear-drop shaped hole: and 60 is a cross-shaped hole. It should be noted that the various shapes of holes of FIGS. 13A–13G will also create a variety of burr configurations which affect fluid flow in the manner discussed herein.

Figure 5:
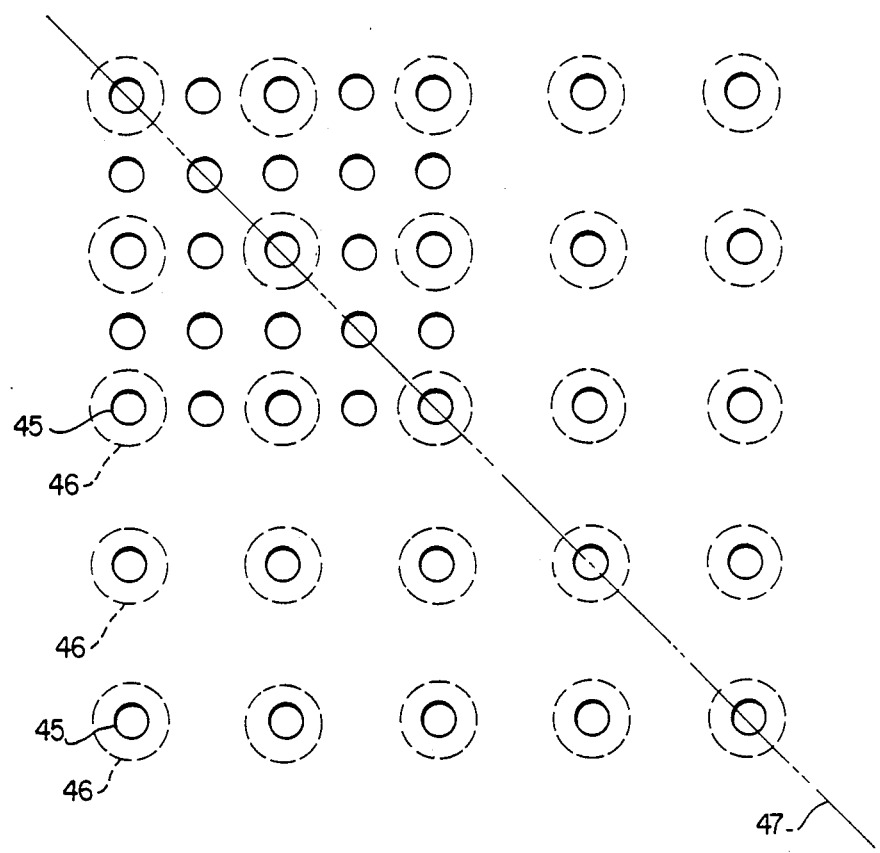
FIG. 5 is a diagrammatic layout of a hole pattern utilized in accordance with the invention, with a hole pattern of the prior art superimposed in dashed lines for comparison.

Attention is directed to FIG. 5 which illustrated an advantage obtained by limiting the hole size to less than about 2 millimeters, as compared to the larger approximately 4 millimeter holes encountered in various parts of the prior art. In FIG. 5 holes of approximately 2 millimeter size are indicated at 45 in full lines, while in dashed lines, larger holes approximately twice the diameter or 4 millimeters are indicated in dashed lines at 46. The pattern of both the prior art holes 46 and the holes of the invention in FIG. 5 is orthogonal and on a square pattern, basically. The hole sizes and spacings are also selected so that there is substantially the same amount or percentage of open space on the plate as FIG. 5 is drawn. If FIG. 5 is considered with the foregoing in mind it can be seen that in the upper left-hand quadrant of FIG. 5 there are a total of five small holes which interrupt a diagonal 47 drawn at 45° to represent a fold line of a corrugation, while only three of the prior art holes interrupt that diagonal. This means that a stream of liquid flowing down a fold of a corrugation in the valley of the corrugation so to speak will engage five small holes for every three large holes it encounters. Thus, it will be divided five times instead of three times, and in addition, the smaller holes are more likely to film over with liquid and are more likely to pass the liquid from one side to the other side of the plate.

The magnitude of the improvement obtained in accordance with the invention is striking. For example, a 4 millimeter triangular hole pattern in a tower packing of selected crimp height or corrugation fold-to-fold dimension with a standard test system (ortho-para-xylene at total reflux) produced an H.E.T.P. in one series of tests of about 19 inches. The hole pattern arranged in accordance with the invention in tower packing otherwise the same (2 millimeter holes spaced 5 millimeters apart) produced an H.E.T.P. with the same test system of approximately 11–13 inches. This improved efficiency can be exploited through reduced tower height and reduced energy costs for operating the tower.

From the foregoing discussion it can be seen that in one sense an ideal structure would have a corrugation fold at every interval (considered on a horizontal projection basis) of the spacing (hole-center-to-hole-center) of the holes, since this would mean that basically every hole would fall in a fold or crease of the corrugations. However, other considerations, such as the desired pressure drop and the desired maximum area of open space on a plate, as well as the desired maximum hole size, considered as diameter, horizontal extent, or hydraulic radius, mean that not all tower packings are desirably built in this ideal manner.

In the prior art there are teachings that a triangular hole pattern is to be considered preferable to the orthogonal hole pattern of the preferred embodiments of the present invention (See U.S. Pat. No. 3,918,688 and Canadian Patent No. 1,095,827 and Japanese Utility Model No. 44-4761). However, triangular hole patterns are more awkward to form as a matter of stamping tooling, particularly if a progressive die press is employed, and if the hole size and spacing constraints taught in accordance with the present invention are followed, the orthogonal pattern of hole spacing produces just as favorable results as the triangular hole pattern taught by the prior art. There is, in accordance with the invention, thus no undesirable trade-off between ease of manufacturing and tower packing performance such as is implicit in the teachings of the prior art.

On FIGS. 7 through 12 there are illustrated various aspects of the burr feature of the present invention. In FIG. 7, hole 61 in sheet 62 has a burr 63 formed around its upper margin. As flow lines 64 indicates diagrammatically, burr 63 tends to aid in diverting liquid flow around the hole.

FIG. 8 is similar to FIG. 7, and illustrates a hole 65 in sheet 66 with a burr 67 formed around its lower margin. Burr 67 tends to aid in diverting liquid flow through hole 65, as is indicated diagrammatically be flow lines 68.

FIGS. 9, 10, and 11 are similar cross-sectional elevational views showing diagrammatically how the holes and burrs appear from the side. In FIG. 9 the burrs 70 are at the tops of holes 71 in sheet 72, and will tend to divert flow of liquid around the holes. All of the burrs 70 project to one side of sheet 72 and their effect on liquid flow will be confined to that side of the sheet.

In FIG. 10 the burrs 73 and 74 are also at the tops of holes 75 in sheet 76 and will tend to divert flow of liquid around the holes. However burrs 73 project to one side of the sheet 76 and burrs 74 project to the other, so they will affect liquid flow on both sides of the sheet.

FIG. 11 shows burrs 77 located at the bottoms of holes 78 in sheet 79. These burrs will tend to divert liquid flow through holes 78 as is indicated by flow line 80.

In FIGS. 7 through 11, the length of a burr may be taken to be its horizontal or arcuate extent; its width or thickness may be regarded as its vertical extent; and its height may be taken to be the distance it projects above the sheet.

FIG. 12 is copied from a micro-photograph showing a hole in a 0.005 inch thick sheet of stainless steel edge-on at a magnification of about 100x. The burr 81 is concentrated on one side of hole 82 in sheet 83.

In the table produced just below, size measurements on burrs found on 2 millimeter and 4 millimeter round holes are reported. From this table the effect of hole size on burr size described above may be seen quantitatively. The small holes produce the more formidable holes which act as more effective liquid dividers and diverters.

From the foregoing it can be seen that there is provided in accordance with the present invention a superior tower packing which is easily constructed and very efficient in operation.

TABLE 1

DIMENSIONAL MEASUREMENTS ON 5-MIL SHEET, INCHES

| Hole Diameter | Burr Height | Burr Length | Width |
|---|---|---|---|
| 2 mm | 0.012–0.015 | 0.017–0.020 | 0.003 |
| 2 mm | 0.011–0.018 | 0.017–0.023 | — |
| 2 mm | 0.003–0.015 | 0.008–0.020 | 0.002 |
| 2 mm | 0.002–0.004 | 0.007–0.009 | — |
| 2 mm | 0.003–0.008 | 0.008–0.013 | 0.004 |

TABLE 1-continued

DIMENSIONAL MEASUREMENTS ON 5-MIL SHEET, INCHES

| Hole Diameter | Burr Height | Burr Length | Width |
|---|---|---|---|
| 2 mm | 0.001–0.012 | 0.006–0.017 | 0.002 |
| Avg. | 0.0053–0.012 | 0.105–0.017 | |
| 4 mm | 0.002–0.003 | 0.007–0.008 | 0.001 |
| 4 mm | 0.001–0.005 | 0.006–0.010 | 0.002 |
| 4 mm | 0.001–0.002 | 0.006–0.007 | — |
| 4 mm | 0.002–0.005 | 0.007–0.010 | 0.0003 |
| 4 mm | 0.002–0.004 | 0.007–0.009 | — |
| 4 mm | 0.001–0.005 | 0.006–0.010 | 0.002 |
| Avg. | 0.0015–0.004 | 0.0065–0.009 | |

Avg. Height Ratio (2 mm/4 mm) = 0.012/0.005 = 8

Avg. Length Ratio (2 mm/4 mm) = 0.017/0.0065 = 2.65

No Overlapping of Avg. Height as well as Avg. Length Between 2 mm and 4 mm Holes.

What is claimed is:

1. A structured tower packing for vapor-liquid contact comprising a plurality of sheets of corrugated material, the sheets being arranged generally vertically and parallel to one another with the corrugations of adjacent sheets criss-crossing one another, said arranged, vertical sheets being provided with a plurality of holes for effecting both liquid and vapor distribution in said packing, said sheets having a fold-to-fold dimension of the corrugations as substantially being a select multiple of the horizontal spacing between holes of the packing, said holes being formed in said arranged sheets with said horizontal spacing between adjacent holes being no greater than about five times the horizontal extent of a hole, and in no event greater than about 5 millimeters and the horizontal extent of said holes being no greater than about 2 millimeters.

2. A tower packing in accordance with claim 1 in which the horizontal extent of said holes in no less than about 1 millimeter.

3. A tower packing in accordance with claim 1 in which the vertical spacing between adjacent holes is no greater than about 5 millimeters.

4. A tower packing in accordance with claim 1 in which said holes are other than round and have a hydraulic radius of no greater than about 1 millimeter.

5. A tower packing in accordance with claim 1 in which said holes are substantially round.

6. A tower packing in accordance with claim 1 in which the open area on a given sheet established by said holes is no greater than about 20% of the area of said sheet.

7. A tower packing in accordance with claim 1 in which said sheets are formed of metal.

8. A tower packing in accordance with claim 1 in which said sheets are made of plastic.

9. A tower packing in accordance with claim 1 in which said sheets are formed of paper.

10. A tower packing in accordance with claim 1 in which said sheets are formed of a ceramic.

11. A tower packing in accordance with claim 1 in which said sheets are formed of an expanded material.

12. A tower packing in accordance with claim 1 in which said packing is formed of woven wire.

13. A tower packing in accordance with claim 1 in which said packing is formed of knitted wire.

14. A tower packing in accordance with claim 1 in which said sheets contain slits.

15. A tower packing in accordance with claim 1 in which fewer than all of said sheets in a given packing are corrugated.

16. A tower packing in accordance with claim 1 in which at least some of the sheets in a given packing are planar.

17. A tower packing in accordance with claim 1 in which said holes are arranged generally orthogonally on said sheets.

18. A tower packing in accordance with claim 3 in which said holes are spaced substantially equally horizontally and vertically.

19. A tower packing in accordance with claim 6 in which the angle said corrugations strike to the vertical axis of said packing is about 45°.

20. A tower packing in accordance with claim 1 in which the angle said corrugations strike to the vertical axis of said packing and the fold-to-fold dimension of said corrugations are so selected with respect to the horizontal and vertical extent of a hole and the horizontal and vertical spacing between adjacent holes that a plurality of said holes fall on a given corrugation fold of a sheet.

21. A tower packing in accordance with claim 20 in which the horizontal projection of said fold-to-fold dimension is substantially a multiple of the horizontal spacing between holes.

22. A tower packing in accordance with claim 21 in which said multiple is 2 or more.

23. A tower packing in accordance with claim 22 in which said multiple is between 2 and 20.

24. A tower packing in accordance with claim 1 in which at least some of said holes have burrs projecting outwardly from said sheets.

25. A tower packing in accordance with claim 24 in which said burrs project from opposite sides of a given sheet.

26. A tower packing in accordance with claim 24 in which at least some of said burrs are at the upper edges of said holes.

27. A tower packing in accordance with claim 24 in which at least some of said burrs are at the lower edges of said holes.

* * * * *